Figure 1:
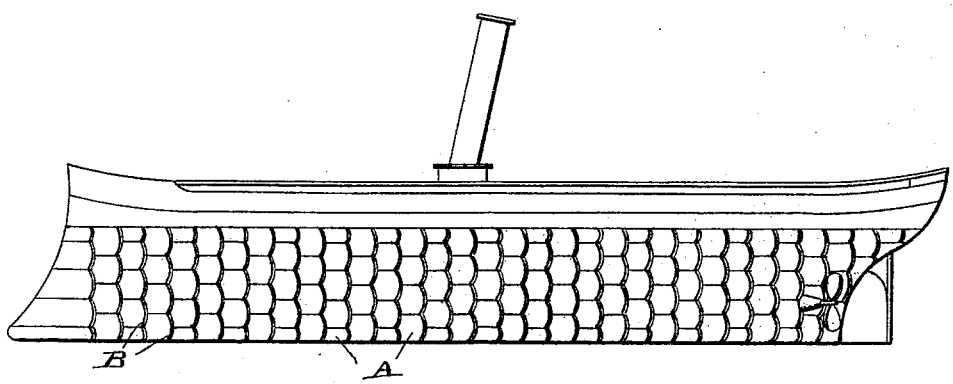

No. 632,738. Patented Sept. 12, 1899.
J. O'HARA.
COVERING FOR BODIES IMPELLED THROUGH WATER.
(Application filed Dec. 2, 1898.)
(No Model.)

Witnesses
Jas. H. Blackwood
H. P. Doolittle

Inventor
James O'Hara
By M. H. Doolittle & Son
Attorneys.

THE NORRIS PETERS CO., PHOTO-LITHO., WASHINGTON, D. C.

United States Patent Office.

JAMES O'HARA, OF TORONTO, CANADA.

COVERING FOR BODIES IMPELLED THROUGH WATER.

SPECIFICATION forming part of Letters Patent No. 632,738, dated September 12, 1899.

Application filed December 2, 1898. Serial No. 698,057. (No model.)

*To all whom it may concern:*

Be it known that I, JAMES O'HARA, a subject of the Queen of Great Britain, residing at Toronto, in the county of York, Province of Ontario, Dominion of Canada, have invented a new and useful Covering for Bodies Impelled Through Water, of which I do hereby declare that the following is a full, clear, and exact specification, such as will enable others skilled in the art to which the invention appertains to make and use the same—

My invention relates to coverings for bodies impelled through water, and has for its object to lessen the attraction between the body and the water and the cohesion of the latter, whereby the body impelled is more effectively cleared of what is known as "dead water," thus materially reducing the resistance caused by such water and utilizing to a fuller extent the impelling force wasted in overcoming that resistance.

Ships' skins, the surfaces of propeller-blades, and similar marine bodies as now constructed are made as smooth and even as possible with a view to offering the least possible resistance. With this construction it is found that the vessels or other bodies cannot clear themselves of what is generally called "dead water," but will during their progress carry with them at the expense of the propelling power a large amount of the surrounding water. The dead water is not only dragged along by the vessel or similar structure, but is also pushed in front thereof in a large body, which will fail to divide until heaped forward of the bows of the vessel or like projections of similar structures. This pushing and dragging of the water is caused by its cohesion. The result of this is that a large part of the propelling power must be expended in overcoming the resistance of this pushing and dragging water. To obviate this difficulty as much as possible, vessels are tapered not only at the bow, but from midships to stern, making the lines forward and aft as fine as possible, whereby the vessel is enabled to divide the water more cleanly at the bows and to clear itself of the surrounding water which is being dragged after it; but even with this construction, however fine the lines may be, the difficulty is far from being removed.

The same difficulty attends the driving of the blades of the propeller-screw through the water. In order to propel the vessel, the blades must continually pass through the water, taking in new water and forcing it to the rear. If the screw is driven too fast, it will carry around with it the whole body of water in which it is moving, which will prevent its taking in new water or making much forward movement. This condition is due to the same cause of cohesion. If the blades could continually pass through the water and not drag it with them, the faster the screw revolved the greater would be the propelling force obtained. My invention is intended to meet or remove or modify these difficulties and enable a ship to clear herself of dead water and also to enable the screw-blades better to pass through the water and free themselves of it.

I have discovered that the cohesion of the water may be counteracted and neutralized by producing vibration in a very thin stratum of water next to the object so passing through the water. It is obvious that with a perfectly smooth and even surface below the water-line there will be no vibration, and therefore the cohesion of the water is allowed to act with greater force, and hence the more difficult it is to propel the vessel. It does not follow, however, that roughness or unevenness without design will facilitate the movement of any solid body when passing through water. To accomplish this result, I make the surface of the moving body imbricated or shingle-like, the parts corresponding to shingles being of the form and arranged on and attached to the body, as hereinafter described.

When the imbricated surface is applied to a ship's hull, the water-shed is from bow to stern. When applied to propeller-blades, it is in the opposite direction to the forward movement of the blades.

My invention is illustrated in the accompanying drawings, which show the application of the invention to the hull of a ship, and in which—

Figure 2:
Figure 3:
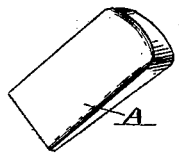

Figure 1 is a side view in elevation of the ship's hull; Fig. 2, a detail plan of one of the imbricated segments, and Fig. 3 a detail perspective of same.

Referring to the drawings, A is one of the pieces corresponding to house-shingles, which is fastened to the hull with the thin end toward the bow. The segments are either secured to the hull just as shingles are put on a roof, so as to overlap and present a series of protrusions and depressions, or they may be rolled or molded or otherwise formed on the plates of iron, steel, wood, or other material which covers the sides, in either case forming an uneven surface which will produce a vibrating stratum of water around the vessel. It is not necessary that each imbricated segment should be a whole plate. There may be many imbricated segments on one plate integral therewith. The rear edges $a$ of each segment are beveled or reduced in rolling or molding. The segments are arranged in rows B, so that they break joint, the rounded end of one segment being opposite the junction of two adjoining segments of the succeeding row. In the case of a vessel the length of a segment should be from one inch to two feet and the width of about the same dimensions, according to the size or tonnage of the vessel, and the imbrication should show at the after end a drop or fall of from one quarter of an inch to two inches, according to the length of the segment. The dimensions for the propeller-blades should vary in accordance with the above.

It is obvious that any suitable arrangement of the overlapping portions or segments forming an imbricated surface adapted to produce a vibrating stratum adjacent to the moving body may be applied to the surface of the body without departing from the principle of my invention.

From the foregoing description it will be seen that my invention will create a vibration of the water surrounding the vessel or other body that will tend to break up the cohesion of the water and will enable the body to pass through the water without carrying the usual burden of dead water.

Having thus described my invention, what I claim is—

1. A covering for bodies impelled through water consisting of an imbricated surface, the imbricated portions thereof arranged with the overlapped or thin edges toward the direction of the forward movement of the impelled body, substantially as described.

2. A covering for bodies impelled through water consisting of imbricated segments having their thin ends pointing in the direction of forward movement of body, and arranged in rows in which the segments of each row break joint with the segments of the succeeding row, substantially as described.

In testimony whereof I hereunto affix my signature in the presence of two witnesses.

JAMES O'HARA.

Witnesses:
NOTT. H. GRIFFIN,
CHAS. SWABEY.